United States Patent
Seo et al.

(10) Patent No.: US 8,882,629 B2
(45) Date of Patent: Nov. 11, 2014

(54) MULTI-STAGE AUTOMATIC TRANSMISSION

(71) Applicant: Hyundai Motor Company, Seoul (KR)

(72) Inventors: Tae Seok Seo, Suwon-si (KR); In Chan Kim, Yongin-si (KR); Byung Dae Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 66 days.

(21) Appl. No.: 13/846,003

(22) Filed: Mar. 18, 2013

(65) Prior Publication Data

US 2014/0128197 A1   May 8, 2014

(30) Foreign Application Priority Data

Nov. 5, 2012   (KR) .................. 10-2012-0124150

(51) Int. Cl.
*F16H 3/66* (2006.01)
*F16H 37/04* (2006.01)
*F16H 1/46* (2006.01)

(52) U.S. Cl.
USPC ................ 475/284; 475/302; 475/903

(58) Field of Classification Search
USPC .............. 475/271, 280–290, 302, 330, 903
See application file for complete search history.

(56) References Cited

U.S. PATENT DOCUMENTS

| 5,653,657 A * | 8/1997 | Park ............................ 475/45 |
| 8,409,046 B2 * | 4/2013 | Phillips ....................... 475/284 |
| 2014/0148298 A1 * | 5/2014 | Lee et al. .................... 475/282 |
| 2014/0148299 A1 * | 5/2014 | Lee et al. .................... 475/284 |

FOREIGN PATENT DOCUMENTS

| JP | 06221387 A | * | 8/1994 |
| JP | 06221388 A | * | 8/1994 |

* cited by examiner

*Primary Examiner* — Roger Pang
(74) *Attorney, Agent, or Firm* — Morgan, Lewis & Bockius LLP

(57) ABSTRACT

A multi-stage automatic transmission in which planet gear mechanisms, external gears and friction elements are combined in order to realize nine forward gears and one rearward gear having excellent operating conditions for friction elements and superior shift range ratios, thereby achieving excellent power performance and fuel efficiency.

13 Claims, 5 Drawing Sheets

|   | C1 | C2 | C3 | C4 | C5 | C6 | Gear Ratio | shift Range Ratio |
|---|---|---|---|---|---|---|---|---|
| 1 |   |   | O |   | O |   | 4.622 | D1/D9= 7.577 |
| 2 |   | O |   |   | O |   | 3.000 | D1/D2= 1.541 |
| 3 |   | O | O |   |   |   | 2.291 | D2/D3= 1.310 |
| 4 |   | O |   |   |   | O | 1.594 | D3/D4= 1.437 |
| 5 |   | O |   | O |   |   | 1.212 | D4/D5= 1.315 |
| 6 | O | O |   |   |   |   | 1.000 | D5/D6= 1.212 |
| 7 | O |   |   | O |   |   | 0.835 | D6/D7= 1.198 |
| 8 | O |   |   |   |   | O | 0.703 | D7/D8= 1.188 |
| 9 | O |   | O |   |   |   | 0.610 | D8/D9= 1.153 |
| R |   |   |   | O | O |   | −4.464 | D1/R= −1.035 |

MULTI-STAGE AUTOMATIC TRANSMISSION

CROSS-REFERENCE TO RELATED APPLICATION

The present application claims priority of Korean Patent Application Number 10-2012-0124150 filed Nov. 5, 2012 the entire contents of which application is incorporated herein for all purposes by this reference.

BACKGROUND OF INVENTION

1. Field of Invention

The present invention relates, in general, to an automatic transmission, and more particularly, to the structure of a multi-stage automatic transmission which is disposed in a vehicle and can provide a plurality of transmission gear ratios.

2. Description of Related Art

In general, the multi-stage transmission mechanism of an automatic transmission is realized by combining a plurality of planet gears and friction elements. Because a vehicle having more excellent power performance and fuel efficiency can be realized when more shift ranges can be realized, studies on automatic transmissions which can realize more shift ranges are constantly underway.

In addition, even at the same shift range, the endurance, power transfer efficiency, size and the like of a gear train vary depending on the way that the plurality of planet gears and the friction numbers are combined. Therefore, attempts to invent a gear train structure which is stronger, consumes less power and is more compact have been made and are currently underway.

In addition, when a plurality of shift ranges are provided, at a viewpoint of shift control, whether or not a shift gear operation condition for disabling one friction element and enabling the other friction element during sequential shifting to the adjacent shift range is satisfied, and whether or not the shift ratio and range ratio between adjacent shift gears are of suitable levels, are two conditions gaining interest as distinctive functions in the field of gear trains. In addition, attempts to invent a gear train structure which satisfies such functions are underway.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art, and the present invention is intended to propose a multi-stage automatic transmission in which planet gear mechanisms, external gears and friction elements are combined in order to realize nine forward gears and one rearward gear having excellent operating conditions for friction elements and superior shift range ratios, thereby achieving excellent power performance and fuel efficiency.

Various aspects of the present invention provide for a multi-stage automatic transmission which includes an input shaft; an output shaft disposed parallel to the input shaft; a first planet gear mechanism coaxially disposed on the input shaft, the first planet gear mechanism having two rotary elements which are connected to the input shaft so as to engage with and disengage from the input shaft; a second planet gear mechanism connected to the first planet gear mechanism via a plurality of pairs of external gears, the second planet gear mechanism being connected to the output shaft; the plurality of pairs of external gears for transferring power between one rotary element of the rotary elements of the second planet gear mechanism that is connected to neither the first planet gear mechanism nor the output shaft and the input shaft; a plurality of power engaging/disengaging members for switching power transmission via the plurality of pairs of external gears between the rotary elements of the second planet mechanism and the input shaft; and a restraint member capable of halting the movement of one rotary element of the rotary elements of the second planet gear mechanism which is connected to neither the first planet gear mechanism nor the output shaft.

In the multi-stage automatic transmission according to various aspects of the present invention, the planet gear mechanisms, the external gears and the friction elements are combined in order to realize nine forward gears and one rearward gear having excellent operating conditions for friction elements and superior shift range ratios, thereby achieving excellent power performance and fuel efficiency.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figures 1, 2:
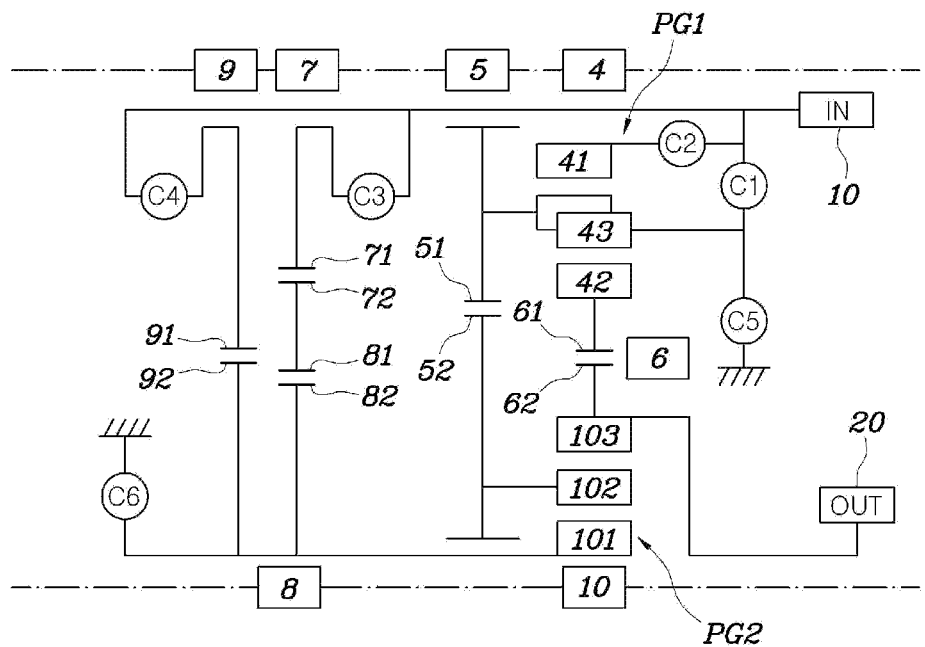
FIG. 1 is a configuration view showing an exemplary multi-stage automatic transmission according to the present invention.
FIG. 2 is a table showing exemplary operation modes according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Referring to FIG. 1 to FIG. 9, a multi-stage automatic transmission according to various embodiments of the present invention includes an input shaft 10, an output shaft 20, a first planet gear mechanism PG1, a second planet gear mechanism PG2, a plurality of pairs of external gears, a plurality of power engaging/disengaging members and a restraint member. Here, the output shaft 20 is disposed parallel to the input shaft 10. The first planet gear mechanism PG1 is coaxially disposed on the input shaft 10, and has two rotary elements which are connected to the input shaft 10 so as to engage with and disengage from the input shaft 10. The second planet gear mechanism PG2 is connected to the first planet gear mechanism PG1 via the pairs of external gears, and is connected to the output shaft 20. The plurality of pairs of external gears can transfer power between one rotary element of the rotary elements of the second planet gear mechanism PG2 that is connected to neither the first planet gear mechanism PG1 nor the output shaft 20 and the input shaft 10. The plurality of power engaging/disengaging members can switch power transmission via the pairs of external gears between the rotary elements of the second planet mechanism PG2 and the input shaft 10. The restraint member can halt the movement of one rotary element of the rotary elements of the second planet gear mechanism PG2 which is connected to neither the first planet gear mechanism PG1 nor the output shaft 20.

The multi-stage automatic transmission which realizes nine forward gears and one rearward gear is constructed of a combination of two planet gear mechanisms, five pairs of external gears and six friction elements which are disposed between the parallel input and output shafts 10 and 20.

Here, the friction element is a term that comprehensively includes the power engaging/disengaging member and the restraint member.

According to various embodiments, one rotary element of the first planet gear mechanism PG1 that is connected to the input shaft 10 such that the rotary element can engage with and disengage from the input shaft 10 is connected to the rotary element of the second planet gear mechanism PG2 via a pair of external gears 51 and 52. A first brake C5 which can halt the rotation of the rotary elements connected to the first pair of external gears 51 and 52 is also provided.

The first planet gear mechanism PG1 is configured as a double pinion planet gear mechanism, in which a first linear gear 41 and a first carrier 43 are connected to the input shaft 10 such that they can engage with and disengage from the input shaft 10. The first carrier 43 is connected to the input shaft 10 via a first clutch C1 such that it can engage with and disengage from the input shaft 10. The first linear gear 41 is connected to the input shaft 10 via a second clutch C2 such that it can engage with and disengage from the input shaft 10.

In addition, the second planet gear mechanism PG2 is configured as a single pinion planet gear mechanism. A second carrier 102 of the second planet gear mechanism PG2 is connected to the first carrier 43 of the first planet gear mechanism PG1 via the first pair of external gears 51 and 52. A second ring gear 103 of the second planet gear mechanism PG2 is connected to the output shaft 20, and is connected to a first ring gear 42 of the first planet gear mechanism PG1 via a second pair of external gears 61 and 62.

One rotary element of the rotary elements of the second planet gear mechanism PG2 which is connected to neither the first planet gear mechanism PG1 nor the output shaft 20 is a second linear gear 101. The pairs of external gears between the second linear gear 101 and the input shaft 10 include a third pair of external gears 71 and 72 which are linearly disposed between the input shaft 10 and the second linear gear 101, a fourth pair of external gears 81 and 82, and a fifth pair of external gears 91 and 92 which are disposed parallel to the third pair of external gears 71 and 72 and the fourth pair of external gears 81 and 82.

The above described configuration is common to various embodiments of the present invention.

With reference to FIG. 1, the power engaging/disengaging members may include a third clutch C3 which is disposed between the input shaft 10 and the third pair of external gears 71 and 72 and a fourth clutch C4 which is disposed between the input shaft 10 and the fifth pair of external gears 91 and 92. The restraint members are configured as a second brake C6 which is directly coupled to the second linear gear 101.

Figure 4:
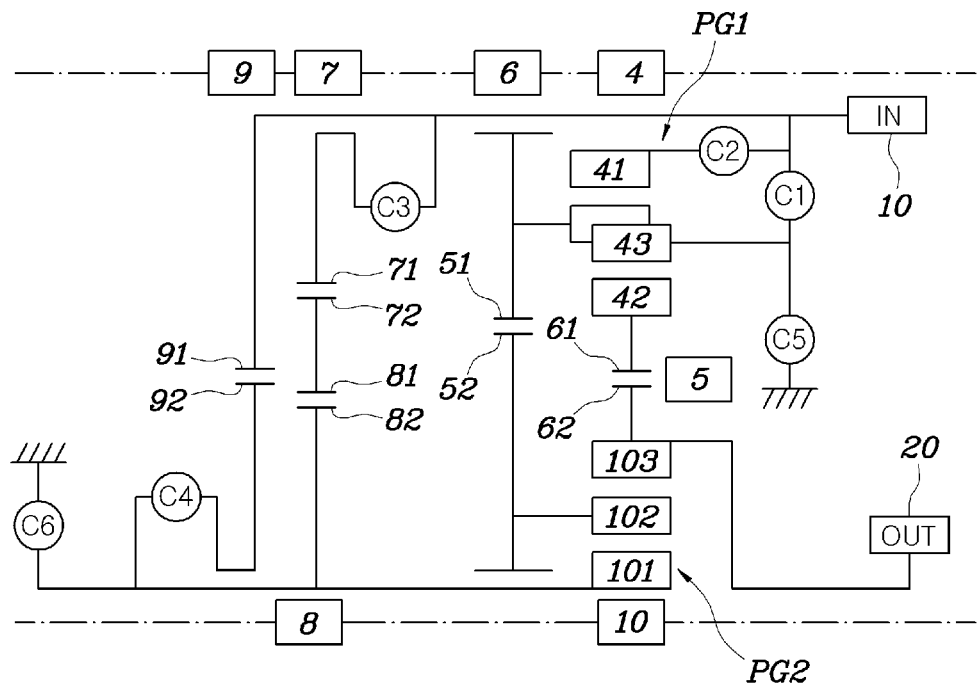
FIG. 4 is a configuration view showing an exemplary multi-stage automatic transmission according to the present invention.

With reference to FIG. 4, the power engaging/disengaging members may include a third clutch C3 which is disposed between the input shaft 10 and the third pair of external gears 71 and 72 and a fourth clutch C4 which is disposed between the fifth pair of external gears 91 and 92 and the second linear gear 101. The restraint members are configured as a second brake C6 which is directly coupled to the second linear gear 101.

Figure 5:
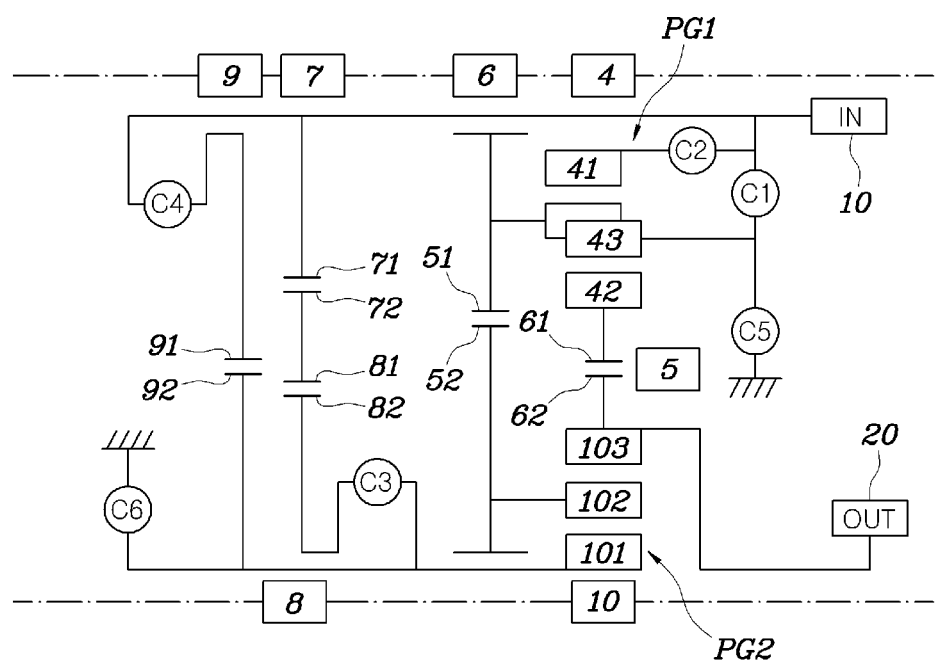
FIG. 5 is a configuration view showing an exemplary multi-stage automatic transmission according to the present invention.

With reference to FIG. 5, the power engaging/disengaging members may include a third clutch C3 which is disposed between the fourth pair of external gears 81 and 82 and the second linear gear 101 and a fourth clutch C4 which is disposed between the input shaft 10 and the fifth pair of external gears 91 and 92. The restraint members are configured as a second brake C6 which is directly coupled to the second linear gear 101.

Figure 6:
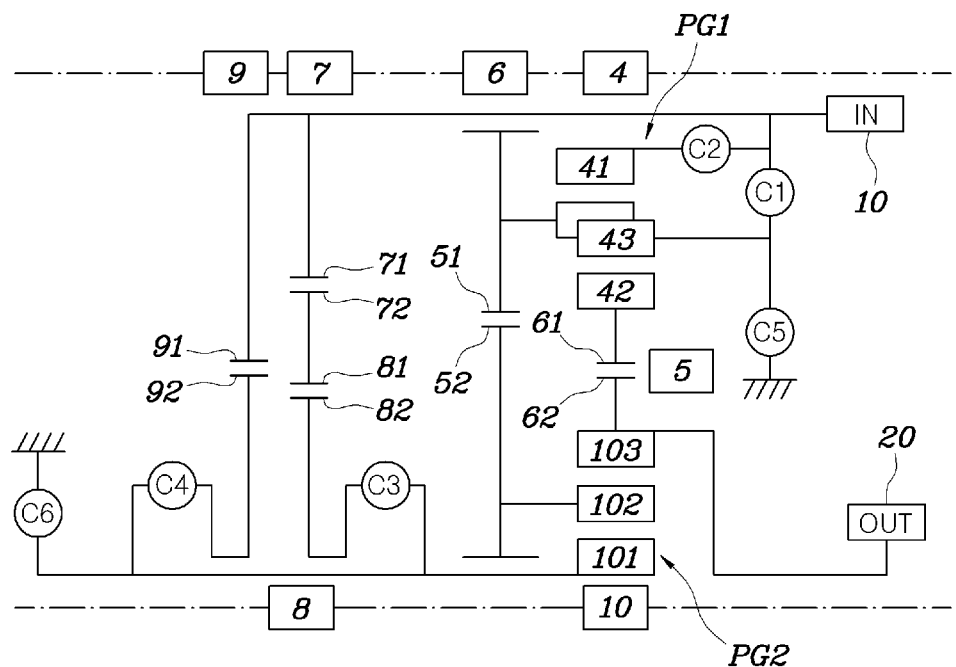
FIG. 6 is a configuration view showing an exemplary multi-stage automatic transmission according to the present invention.

With reference to FIG. 6, the power engaging/disengaging members may include a third clutch C3 which is disposed between the fourth pair of external gears 81 and 82 and the second linear gear 101 and a fourth clutch C4 which is disposed between the fifth pair of external gears 91 and 92 and the second linear gear 101. The restraint members are configured as a second brake C6 which is directly coupled to the second linear gear 101.

In addition, the first brake C5 can be connected to the first carrier 43 of the first planet gear mechanism PG1 which is connected to the first pair of external gears 51 and 52. This configuration is commonly provided in various embodiments except for that shown in FIG. 7.

Figure 7:
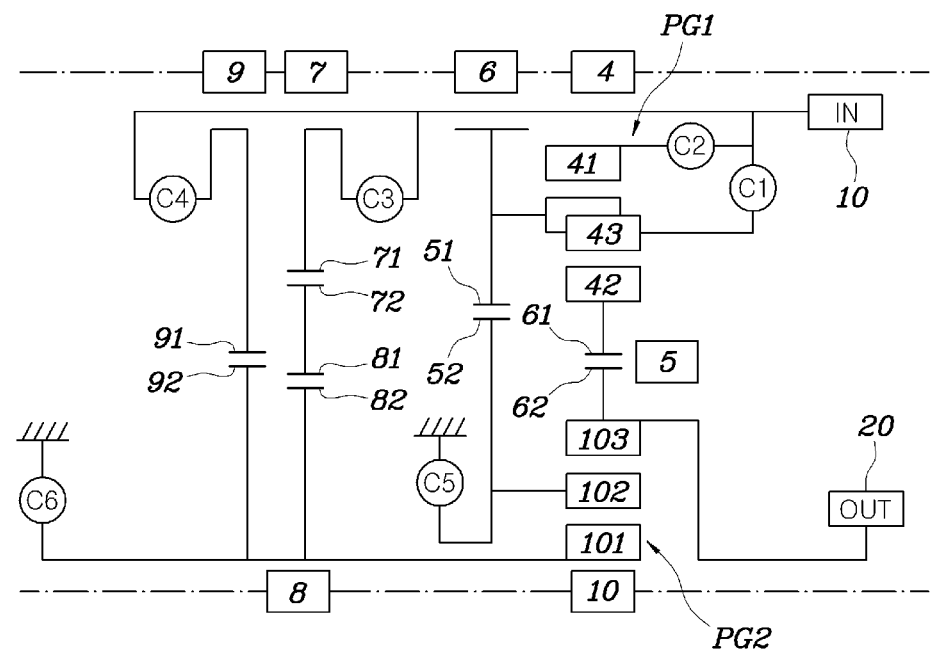
FIG. 7 is a configuration view showing an exemplary multi-stage automatic transmission according to the present invention.

With reference to FIG. 7, the first brake C5 may be connected to the second carrier 102 of the second planet gear mechanism PG2 which is connected to the first pair of external gears 51 and 52. That is, the first brake C5 can be configured such that it is connectable to any element which is connected to the pair of external gears 51 and 52 so as to transfer power.

Figure 8:
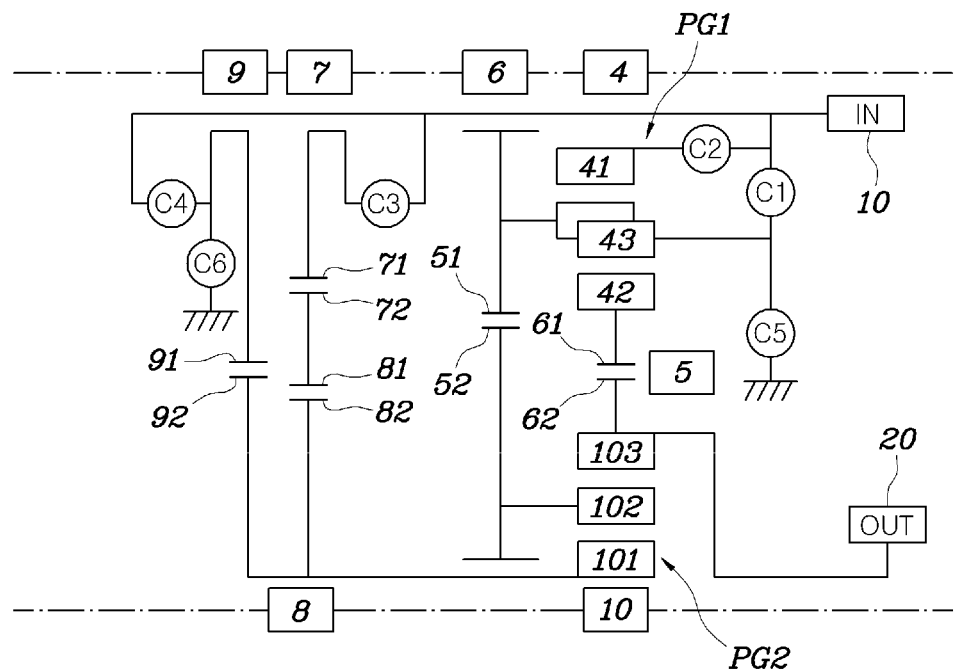
FIG. 8 is a configuration view showing an exemplary multi-stage automatic transmission according to the present invention.

With reference to FIG. 8, the power engaging/disengaging members may include a third clutch C3 which is disposed between the input shaft 10 and the third pair of external gears 71 and 72 and a fourth clutch C4 which is disposed between the input shaft 10 and the fifth pair of external gears 91 and 92. The restraint members are configured as a second brake C6 which is directly connected between the fourth clutch C4 and the fifth pair of external gears 91 and 92.

Figure 9:
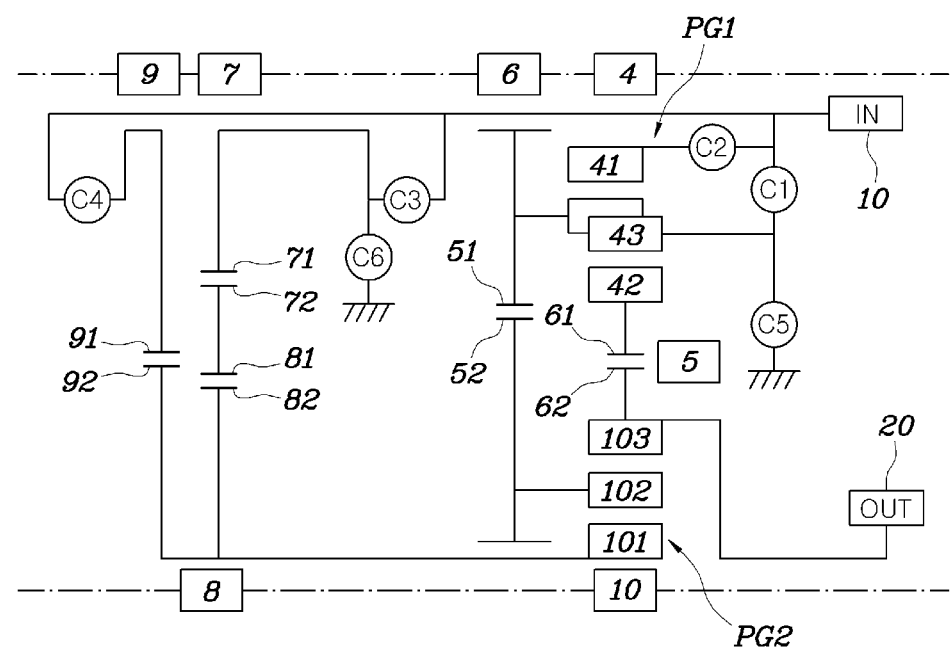
FIG. 9 is a configuration view showing an exemplary multi-stage automatic transmission according to the present invention.

With reference to FIG. 9, the power engaging/disengaging members may include a third clutch C3 which is disposed between the input shaft 10 and the third pair of external gears 71 and 72 and a fourth clutch C4 which is disposed between the input shaft 10 and the fifth pair of external gears 91 and 92.

The restraint members are configured as a second brake C6 which is directly connected between the third clutch C3 and the third pair of external gears 71 and 72.

The various embodiments discussed herein, which are configured as above, may realize first to ninth forward shift gears and one rearward gear depending on the operation mode table shown in FIG. 2. As apparent from the operation mode table, the operating condition for disabling one friction element and enabling the other friction element during sequential shifting to the adjacent gear is satisfied, and the shift ranges between adjacent gears are set to be suitable.

Figure 3:
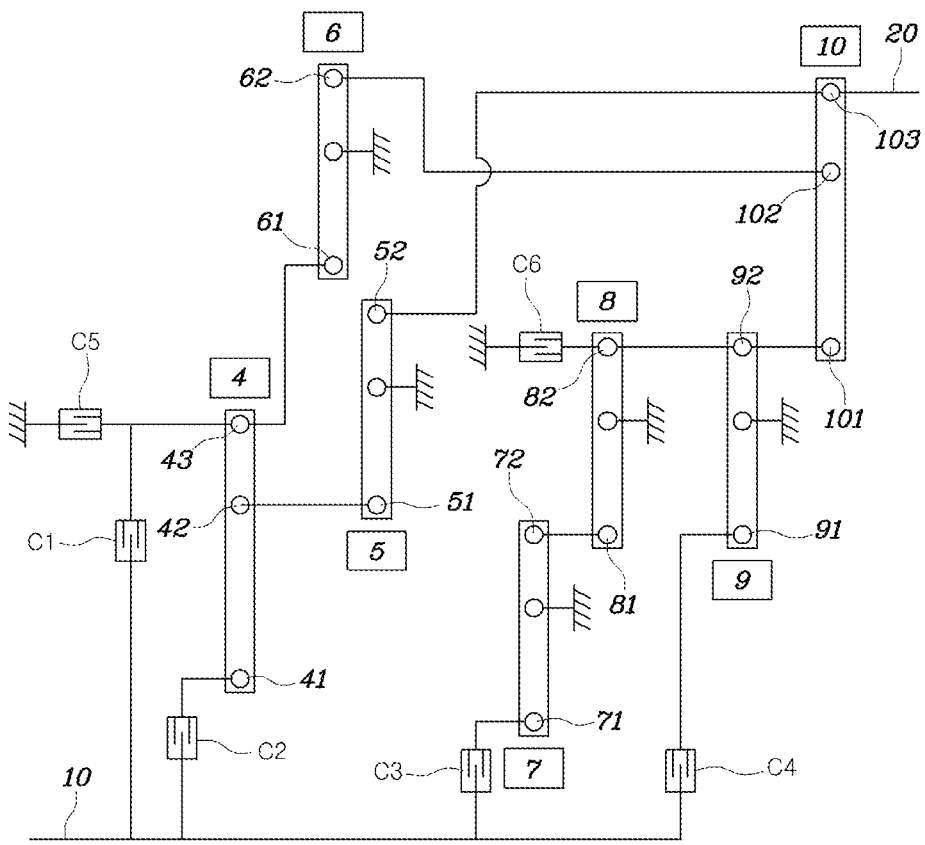
FIG. 3 is a lever diagram in which the structure of the transmission of FIG. 1 is shown.

For reference, each block in which one of numbers 4 to 10 is written as shown in the figures presents a section which corresponds to one lever in the lever diagram in FIG. 3.

For convenience in explanation and accurate definition in the Appended claims, the terms forward or rearward, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stage automatic transmission comprising:
   an input shaft;
   an output shaft disposed parallel to the input shaft;
   a first planet gear mechanism coaxially disposed on the input shaft, the first planet gear mechanism having two rotary elements connected to the input shaft so as to engage with and disengage from the input shaft;
   a second planet gear mechanism connected to the first planet gear mechanism via a plurality of pairs of external gears, the second planet gear mechanism being connected to the output shaft;
   the plurality of pairs of external gears for transferring power between one rotary element of the rotary elements of the second planet gear mechanism that is connected to neither the first planet gear mechanism nor the output shaft and the input shaft;
   a plurality of power engaging/disengaging members for switching power transmission via the plurality of pairs of external gears between the rotary elements of the second planet mechanism and the input shaft; and
   a restraint member capable of halting a movement of one rotary element of the rotary elements of the second planet gear mechanism connected to neither the first planet gear mechanism nor the output shaft.

2. The multi-stage automatic transmission of claim 1, wherein one rotary element of the first planet gear mechanism connected to the input shaft so as to engage with and disengage from the input shaft is connected to a rotary element of the second planet gear mechanism via a first pair of external gears,
   the multi-stage automatic transmission further comprising a first brake capable of halting a movement of the rotary elements connected to the first pair of external gears.

3. The multi-stage automatic transmission of claim 2, wherein the first planet gear mechanism is a double pinion planet gear mechanism including a first linear gear and a first carrier connected to the input shaft so as to engage with and disengage from the input shaft, the first carrier being connected to the input shaft via a first clutch so as to engage with and disengage from the input shaft, and the first linear gear being connected to the input shaft via a second clutch so as to engage with and disengage from the input shaft.

4. The multi-stage automatic transmission of claim 3, wherein the second planet gear mechanism is a single pinion planet gear mechanism, wherein
   a second carrier of the second planet gear mechanism is connected to the first carrier of the first planet gear mechanism via the first pair of external gears, and
   a second ring gear of the second planet gear mechanism is connected to the output shaft and is connected to a first ring gear of the first planet gear mechanism via a second pair of external gears.

5. The multi-stage automatic transmission of claim 4, wherein
   one rotary element of the second planet gear mechanism that is connected to neither the first planet gear mechanism nor the output shaft is a second linear gear, and
   the pairs of external gears between the second linear gear and the input shaft include third and fourth pairs of external gears linearly arranged between the input shaft and the second linear gear and a fifth pair of external gears arranged parallel to the third and fourth pairs of external gears.

6. The multi-stage automatic transmission of claim 5, wherein
   the power engaging/disengaging members comprise a third clutch disposed between the input shaft and the third pair of external gears and a fourth clutch disposed between the input shaft and the fifth pair of external gears, and
   the restraint member comprises a second brake directly coupled to the second linear gear.

7. The multi-stage automatic transmission of claim 5, wherein
   the power engaging/disengaging members comprise a third clutch disposed between the input shaft and the third pair of external gears and a fourth clutch disposed between the fifth pair of external gears and the second linear gear, and
   the restraint member comprises a second brake directly coupled to the second linear gear.

8. The multi-stage automatic transmission of claim 5, wherein
   the power engaging/disengaging members comprise a third clutch disposed between the fourth pair of external gears and the second linear gear and a fourth clutch disposed between the input shaft and the fifth pair of external gears, and
   the restraint member comprises a second brake directly coupled to the second linear gear.

9. The multi-stage automatic transmission of claim 5, wherein
   the power engaging/disengaging members comprise a third clutch disposed between the fourth pair of external gears and the second linear gear and a fourth clutch disposed between the fifth pair of external gears and the second linear gear, and
   the restraint member comprises a second brake directly coupled to the second linear gear.

10. The multi-stage automatic transmission of claim 5, wherein the first brake is connected to the first carrier of first planet gear mechanism connected to the first pair of external gears.

11. The multi-stage automatic transmission of claim 5, wherein the first brake is connected to the second carrier of the second planet gear mechanism connected to the first pair of external gears.

12. The multi-stage automatic transmission of claim 5, wherein
- the power engaging/disengaging members comprise a third clutch disposed between the input shaft 10 and the third pair of external gears and a fourth clutch disposed between the input shaft and the fifth pair of external gears, and
- the restraint member comprises a second brake directly coupled between the fourth clutch and the fifth pair of external gears.

13. The multi-stage automatic transmission of claim 5, wherein
- the power engaging/disengaging members comprise a third clutch disposed between the input shaft and the third pair of external gears and a fourth clutch which is disposed between the input shaft and the fifth pair of external gears, and
- the restraint member comprises a second brake which is directly coupled between the third clutch and the third pair of external gears.

* * * * *